(No Model.)

6 Sheets—Sheet 1.

R. POOLE.
CARTRIDGE LOADING MACHINE.

No. 301,003.

Patented June 24, 1884.

Witnesses:

Inventor:
Robert Poole,
By Chas. F. Benjamin
Att'y.

(No Model.)

R. POOLE.
CARTRIDGE LOADING MACHINE.

No. 301,003. Patented June 24, 1884.

6 Sheets—Sheet 2.

Witnesses:

Inventor:
Robert Poole,
By Chas. F. Benjamin
Att'y.

(No Model.) 6 Sheets—Sheet 3.
R. POOLE.
CARTRIDGE LOADING MACHINE.

No. 301,003. Patented June 24, 1884.

Witnesses:
Inventor:
Robert Poole,
By Chas. F. Benjamin
Atty (No Model.) 6 Sheets—Sheet 4.

R. POOLE.

CARTRIDGE LOADING MACHINE.

No. 301,003. Patented June 24, 1884.

Witnesses:
B. Burnham.
Frank B. Marlow.

Inventor:
Robert Poole,
By Chas. F. Benjamin
Att'y.

(No Model.)  
6 Sheets—Sheet 5.

R. POOLE.
CARTRIDGE LOADING MACHINE.

No. 301,003. Patented June 24, 1884.

Witnesses:
F. D. Burnham.
Frank B. Marlow.

Inventor:
Robert Poole,
By Chas. F. Benjamin
Att'y.

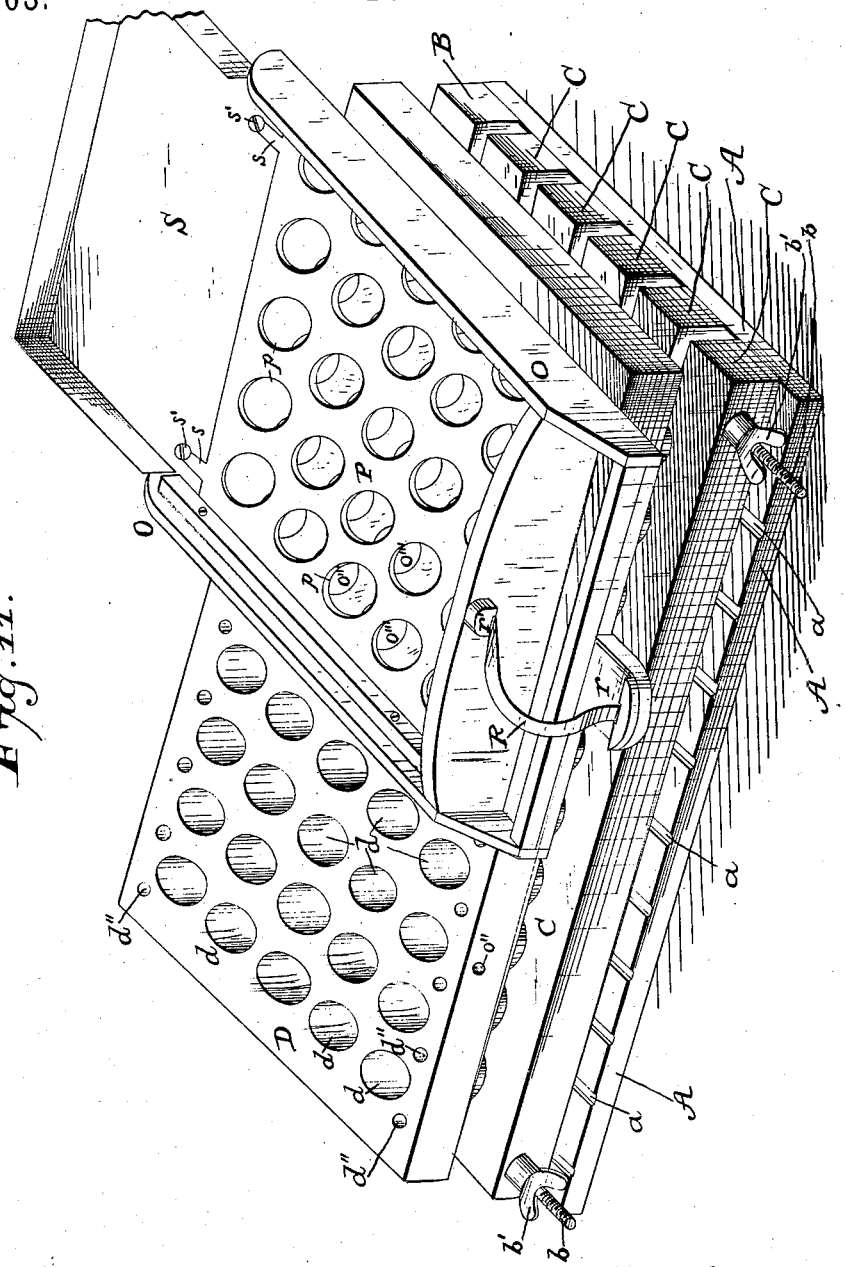

UNITED STATES PATENT OFFICE.

ROBERT POOLE, OF NEW PROVIDENCE, TENNESSEE.

CARTRIDGE-LOADING MACHINE.

SPECIFICATION forming part of Letters Patent No. 301,003, dated June 24, 1884.

Application filed January 7, 1884. (No model.)

*To all whom it may concern:*

Be it known that I, ROBERT POOLE, a citizen of the United States, residing at New Providence, in the county of Montgomery and State of Tennessee, have invented certain new and useful Improvements in Cartridge - Loading Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to cartridge-loading devices intended to be portable, and to be operated by hand-power; and its objects are to increase the simplicity and the efficiency with which empty cartridge-shells can be loaded or reloaded by sportsmen without technical skill in the art of cartridge-making.

The several parts and operations of the device are fully set forth herein; but, with regard to its main features, the mechanism may be briefly described as consisting in a base-board with movable slats, to hold the empty shells in position; a wad-starting plate to rest on the edges of the shells and to guide the charges properly into the shells; a hopper-machine to graduate, measure, and cut off the charges of powder and shot; a cut-off tray to carry the wads to the shells, and a rammer to pack the powder, shot, and wad into the shells.

I do not claim, broadly, the loading of cartridges by hand-working mechanism, nor cartridge-loading machines of a portable character, nor wad-starting plates, nor hopper-machines for regulating charges, but confine myself in those particulars to the peculiar constructions herein described.

Figure 1:
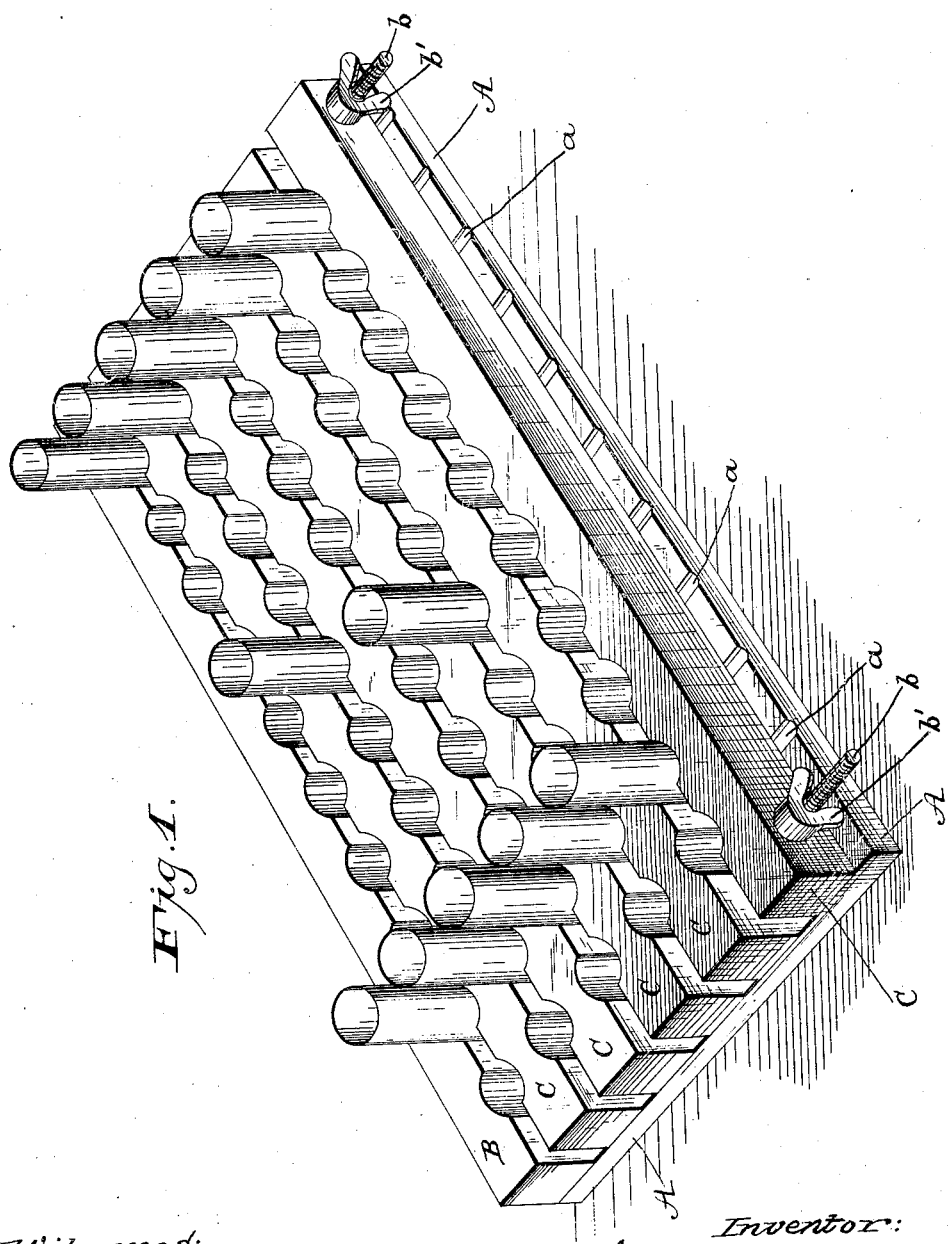
Figure 2:
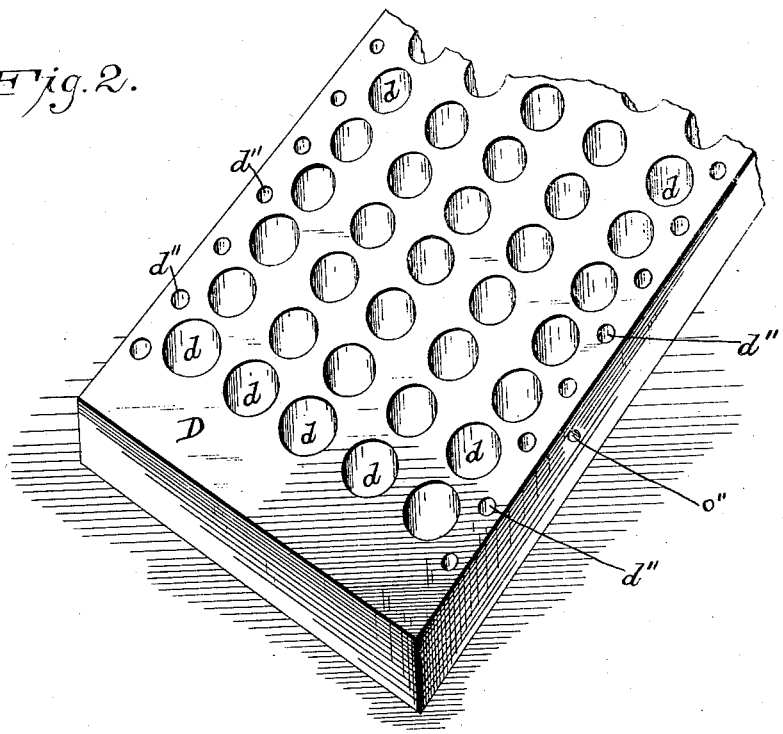
Figure 3:
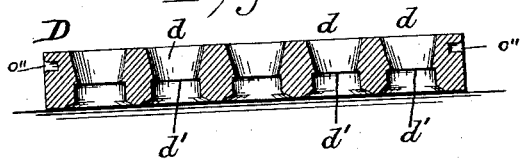
Figure 4:
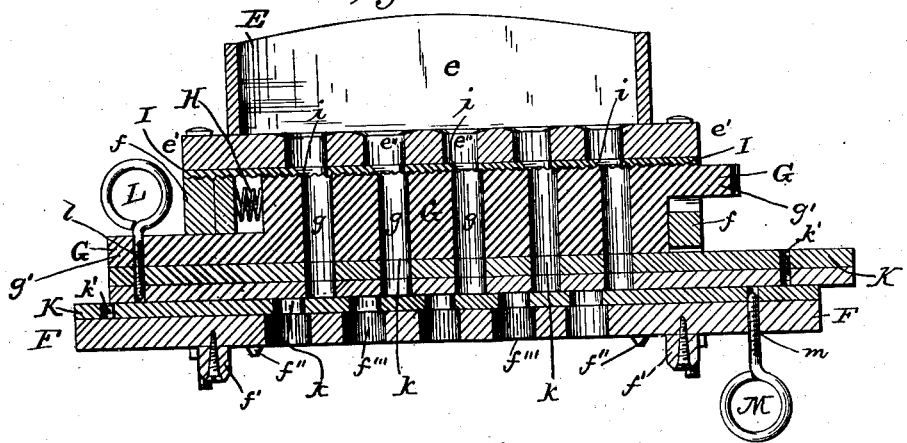
Figure 5:
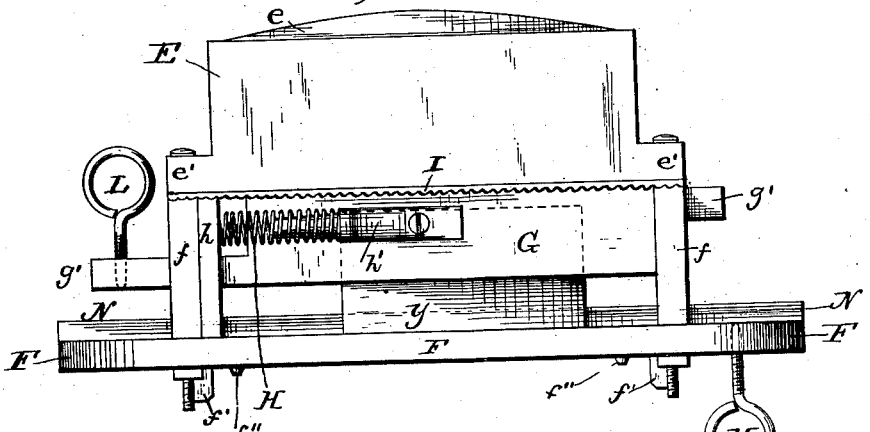
Figure 6:
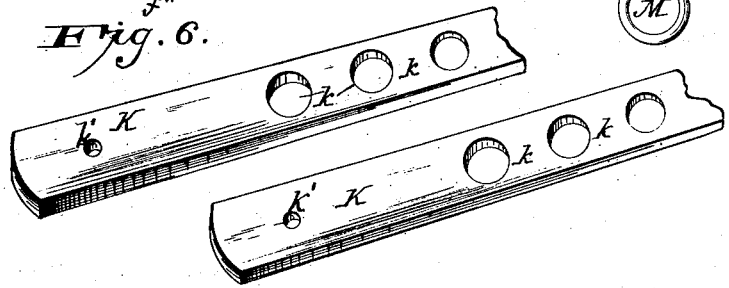
Figure 7:
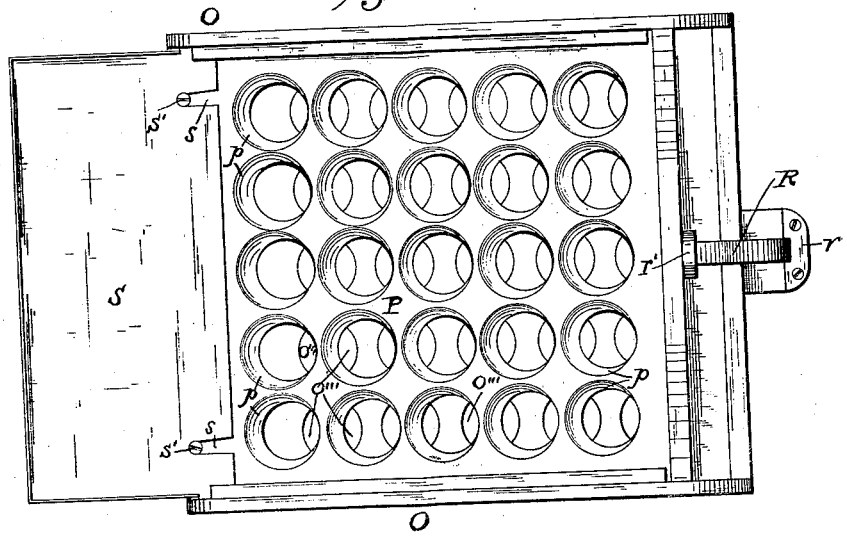
Figure 8:
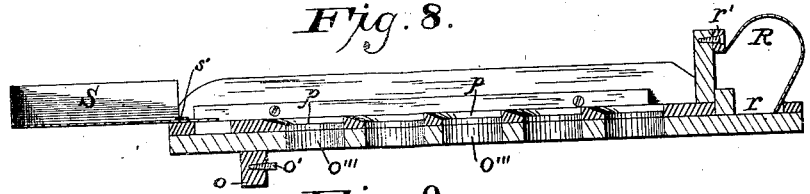
Figure 9:
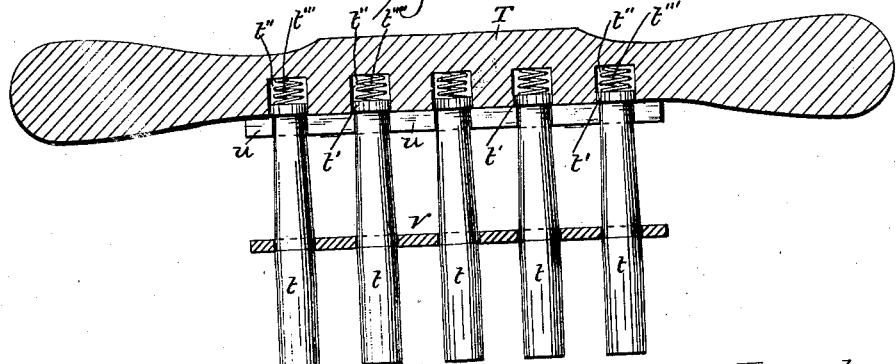
Figure 10:
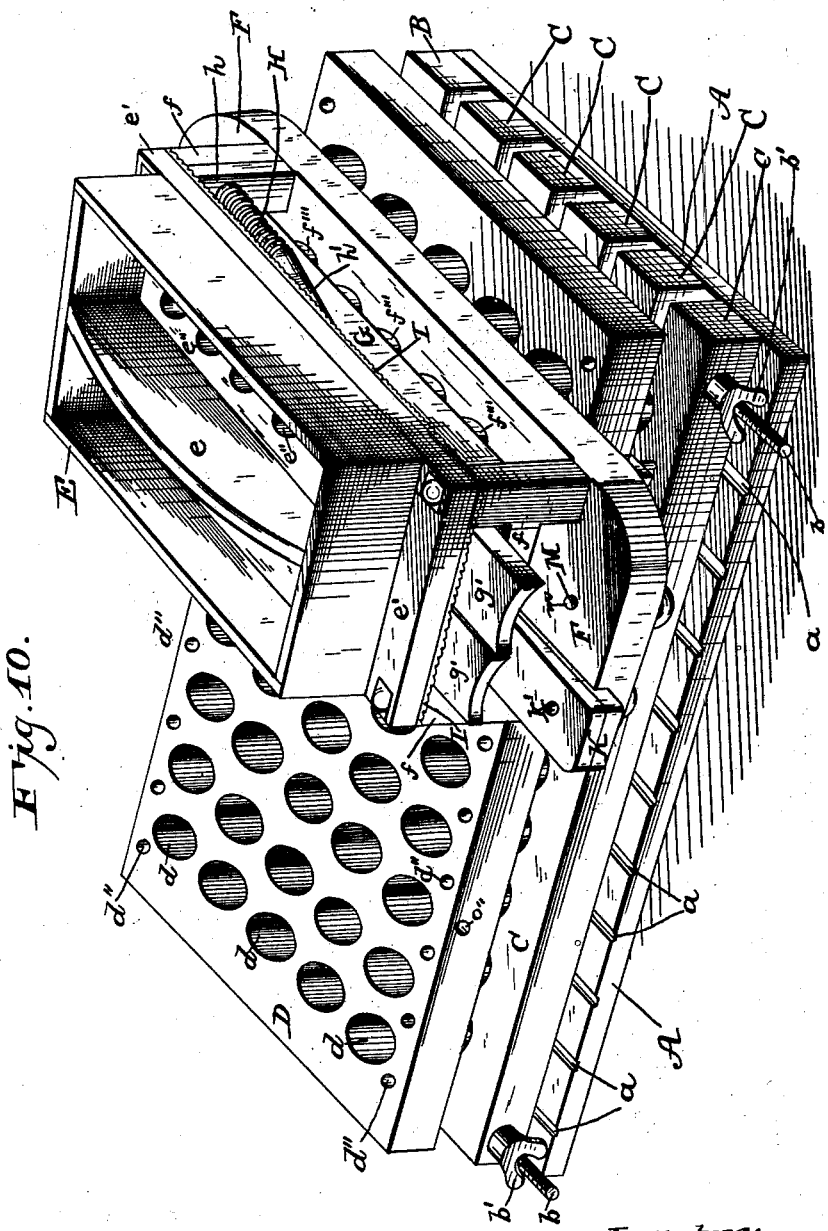

In the accompanying drawings, wherein like letters refer to like parts, Figure 1 is a top perspective of the base-board with its adjustable slats for holding the cartridge-shells. Fig. 2 is a top perspective of the wad-starting plate. Fig. 3 is a vertical section thereof, taken through the center of one of the rows of apertures therein. Fig. 4 is a vertical section lengthwise through the hopper-machine. Fig. 5 is a side perspective thereof. Fig. 6 is a separate view of the adjustable cut-off slats used to increase the charges when needed. Fig. 7 is a top perspective of the wad-tray. Fig. 8 is a vertical section lengthwise through the tray. Fig. 9 is partly a vertical section and partly a front perspective of the wad-rammer. Fig. 10 is a side perspective of the hopper-machine, the wad-starting plate, and the slotted base-board in conjunction; and Fig. 11 is a like view, except that the wad-tray is substituted for the hopper-machine.

A is a base-board of oblong shape, with transverse parallel grooves $a$ cut in the upper surface.

B is a slat fixed in the upper surface of the base-board at one of the two long ends thereof, and provided with two long screw-bolts, $b\ b$, with thumb-nuts $b'\ b'$, in the manner shown by the drawings. Movable slats C C C are threaded upon the bolts, and work easily thereupon in a forward and backward direction. The inner slats are scalloped along both edges in the manner shown; but the fixed slat B and the exterior slat of the movable set are scalloped only on their interior edges. By means of the segments of circles formed by the scalloping, the shells intended to be loaded are each held firmly in place at uniform distances, and the center-fire percussion-cap of each cartridge is brought and held within the boundaries of the walls of one of the grooves $a$, so that there is no danger of explosion from concussion during the process of loading. It will be readily understood that when the empty shells are all in place, ready to be loaded, they are held firmly by tightening up the thumb-nuts on the screw-bolts $b\ b$. Shells of any size may be placed and held properly and firmly between the slats.

D is a wad-starting plate, with round orifices $d$, the centers of which correspond with the centers of the circumferences of the shells when adjusted in the base-board A. These orifices are flared on the under side, so that they may be easily adjusted upon the edges of the shells, and an annular seat, $d'$, is formed in or near the middle of each orifice, so that the plate may sit firmly and evenly upon the set of shells intended to be loaded. The orifices are also slightly flared toward the upper side of the plate, so that the charges of powder and shot may be the better received into the orifices and guided toward the center of each shell.

It is evident from the description given of the base-board, slats, and wad-starting plate that shells of at least three different calibers can be loaded with the same facility.

E is a hopper of oblong shape, divided lengthwise by a partition-wall, e, so that one section may be filled with powder, while the other is filled with shot. The hopper is provided with horizontal flanges $e'$ $e'$, by means of which it rests upon the walls $ff$ of a platform, F. On the under side of this platform are two transverse strips, $f'f'$, which serve to keep the hopper in position when adjusted upon the wad-starting plate D, and short blunt pegs $f''' f'''$ fit into sockets $d''$ $d''$, formed along the upper edges of the wad-starting plate. Each section of the hopper E contains orifices $e''$ $e''$ in the bottom, through which the powder and shot escape on their way to the shells. The bottom of the hopper is channeled or flared toward the orifices, so that the powder and shot poured into the hopper may readily make their way into the orifices. Beneath the hopper are the cut-offs G G, which have orifices $g$ $g$ vertically through them for the passage downward of the powder and shot. These cut-offs are kept in position relatively to the hopper by spiral springs H H, one end of which is recessed into clamps or bearings $h$ $h$, while the other is secured and operated by means of the plug and shoulder formed upon the brackets $h'$ $h'$. The orifices of the cut-offs G correspond with the orifices of the hopper E; but the centers of the two sets of orifices should be a little obliqued lengthwise to insure the proper working of the device provided against jamming when charges of shot are cut off. This device consists of a sheet of hard rubber, I, spread upon and fastened to the exterior bottom of the hopper, and corrugated, in the manner shown, upon the exposed surface. Orifices $i$ $i$ are cut in this sheet of rubber to correspond with the orifices $e''$ $e''$ in the bottom of the hopper, except that one part of the circle of each orifice $i$ $i$ is flattened, so as to form a straight-edged projection across the orifices $e''$, and this straight edge is also beveled downward to form a sharp edge at the lower surface of the rubber sheet I. This sheet of hard rubber, attached, corrugated, and orificed in the manner just described, prevents the jamming of small shot between the bottom of the hopper E and the top of the cut-offs G G when the cut-offs are in operation, while avoiding that degree of friction or percussion which, if wood or metal were used in place of the rubber, might ignite and explode the powder. Flanges $g'$ $g'$ are formed to project horizontally from the ends of the cut-offs G G through the walls $ff$, and the two upper flanges are beveled invariably at the ends, to serve as thumb-knobs for operating the cut-offs G G, the springs H H restoring the cut-offs to their proper position after each operation. A partition-wall, $y$, is erected upon the platform F, to keep the two cut-offs properly beneath the hopper-sections, and outward spreading of the cut-offs is prevented by the flanges $g'$ $g'$, which are confined within the walls $ff$. When powder or shot is poured into the hopper, it escapes into the orifices $g$ $g$ of the cut-offs G G, but can escape no farther, because the bottoms of these orifices are closed by the platform F. When the orifices of a cut-off are full, each orifice contains a single charge of powder or shot, as the case may be. By pushing firmly and smartly against the thumb-knob of the cut-off each charge is passed through orifices $f'''$ $f'''$ in the platform F, and so through the wad-starting plate D into the cartridge-shells. While the cut-off is held by the thumb against the spring, so as to bring the orifices of the cut-off and the platform below into correspondence, the communication is broken between the orifices of the hopper and the cut-off, so that no further escape of powder and shot from the hopper into the cut-off can occur till the cut-off is thrown back by the spring and the communication between the cut-off and the orifices below is broken till another charge is formed in the orifices of the cut-off.

The hopper-machine sits crosswise upon the wad-starting plate D, and charges one cross-row of shells with powder and the next behind it with shot. It is then moved far enough along the plate D to charge two other cross-rows of shells, and so on until all the shells in position are filled. At each remove the position of the hopper on the plate is adjusted by the co-operation of the pegs $f'''$ $f'''$ with the sockets $d''$ $d''$.

As before stated, the cut-off G G, by means of the depth and circumference of their orifices $g$ $g$, measure the charges of powder and shot to be loaded into the shells. For the purpose of increasing the size of the charge when necessary, movable slats K are provided, which fit beneath the cut-offs, and have orifices $k$ corresponding with those in the cut-offs.

In constructing the machine, sufficient room is left between the platform F and the bottom of the cut-offs for the insertion of as many of the slats K as desired. Thumb-screws L L work in eyes $l$ $l$ of the cut-offs, and also in eyes $k'$ $k'$ of the slats, so that each slat penetrated by the thumb-screw is joined to the bottom of the cut-off, and serves to deepen the orifices $g$ $g$, and thus increase the charge of powder or shot. Such slats as are not required may be held by the thumb-screws M M, working through eyes $m$ $m$ in the platform F, and they then become a part of the platform, and their orifices $k$ $k$ correspond with the orifices $f'''$ $f'''$ in the platform.

The charges of shot being always smaller than the charges of powder, I have found it advisable to form a long step, N, beneath the hopper-section, which is selected as the shot-feeder, so that while the bottoms of the two cut-offs are even it is not necessary to use so many slats to fill up the space between the platform and the cut-off. Orifices in the step correspond with the orifices in the platform, so that the charges of shot may pass through the shells beneath. I have also found it desirable to make the slats to be used beneath the shot cut-off thinner than the others, in order to maintain a proper ratio between powder and shot whenever the charge is increased.

When a set of shells has been charged with powder and shot, the hopper-machine is removed from the wad-starting plate D, and the wad-tray O is placed thereupon, its position being regulated by the straight stop $o$, in which is the peg $o'$, which catches in the sockets $o''$ $o'''$ in the long edges of the plate D. Fitted into the wad-tray O is the cut-off P, with flared orifices $p$, corresponding with the orifices $o''''$ $o''''$ in the wad-tray. A bow-spring, R, bearing at one end against a lip, $r$, on the tray, and at the other end against the lug $r'$ of the cut-off P, habitually keeps the orifices of the cut-off and the tray out of correspondence. Wads are poured into the cut-off and manipulated till each orifice is charged with a wad, when the surplus wads are raked by the fingers into the sheet-metal trough S at the lower end of the tray. For convenience of packing, this trough is made adjustable by means of the elongated recesses $s$ $s$ and the buttons $s'$ $s'$. The wads are discharged into the shells by operating the cut-off P against the spring R. When the wads are in the shells, the rammer T is used to press home the load in each shell. The posts $t$ $t$ of this rammer are provided with caps $t'$ $t'$, which fit loosely into sockets $t''$ $t''$, formed in the under surface of the head of the rammer, so as to make allowance for small inequalities of height in shells or their loads, and to insure an equal pressure by each post in the process of ramming. In the head of each socket is a spiral spring, $t'''$, which bears upon the head of the rammer inserted in the socket. This spring enables wads of unequal thickness to be simultaneously rammed. The posts are retained in their sockets by means of yokes $u$ $u$, fitted to either side of the posts, and encircling them. The posts taper outwardly about two-thirds down their length, and a sliding collar, $v$, is fitted upon them, so as to hold each post in true position during the process of ramming.

Having thus fully described my invention, what I claim to be new and useful, and desire to secure by Letters Patent, is—

1. In cartridge-loaders, the combination of the base-board A, having straight parallel grooves $a$ in its upper surface, the slat B, fixed to the top and edge of said base-board, and having screw bolts $b$ projecting therefrom, and thumb-nuts $b'$ at the ends of such bolts, and the movable slats C, threaded and sliding upon the aforesaid screw-bolts, all substantially as and for the purposes described.

2. The wad-starting plate herein described, having the orifices $d$ flared at the under side to fit readily upon the edges of the cartridge-shells, and flared toward the upper side of the plate, as shown, the said wad-starting plate having also the annular seat $d'$ near the middle circumference of each orifice, for the better reception and guidance of the charges of powder and shot, all as herein set forth, for the purposes described.

3. The wad-rammer herein described, having ramming-posts $t$, provided with caps $t'$, which fit loosely into sockets $t''$, and bear against spiral springs $t'''$ in the heads of said sockets, said posts being held in the sockets by the yokes $u$, and made rigid by the collar $v$, all substantially as herein described.

4. In cartridge-loaders, the combination of the wad-tray O, having the strip $o$, orifices $o'''$, and the lip $r$, the cut-off P, having flared orifices $p$, co-operating with the orifices $o'''$, the bow-spring R, bearing against the lip of the wad-tray and the lug $r'$ of the cut-off, and the trough S at the lower end of the wad-tray, provided with notches $s$, to fit upon the buttons $s'$ to hold the trough in place upon the tray, all substantially as and for the purposes described.

5. In cartridge-loaders, the combination of the hopper herein described, divided by the partition-wall $e$, supported by flanges $e'$, and discharging its contents through orifices $e''$; the cut-offs G beneath the hopper, provided with orifices $g$ to discharge the powder and shot from the hopper, flanges $g'$ to aid in the longitudinal movement of said cut-offs, and eyes $l$ for the entrance of the thumb-screws hereinafter mentioned, and carrying brackets $h'$ to form bearings for the cut-off springs of the hopper; the corrugated rubber plate I between the hopper and the cut-offs, having orifices $i$; the slats K beneath the cut-offs, to increase the charges, provided with orifices $k$ to discharge the loads into the shells, and eyes $k'$ for the reception of the herein-mentioned thumb-screws; the thumb-screws L, working through the flanges of the cut-offs, to unite the cut-offs and perforated slats when deeper charges are required; the thumb-screws M, working upward through the platform-floor hereinafter mentioned, to hold in place the slats not united to the cut-offs; the platform F, bearing the walls $f$, which support the hopper and inclose the cut-offs, the partition $y$, which keeps the two cut-offs a proper distance longitudinally apart, and the clamps $h$, which receive and support the cut-off springs, said platform having orifices $f'''$ to discharge the loads passing from the hopper to the shells, and eyes $m$ for the reception of the thumb-screw M, hereinbefore mentioned, and being further provided with guide-strips $f'$ on the under side; the orificed step N upon the said platform, to compensate for the greater depth of the cut-off used for measuring powder as compared with that used for measuring shot; and the spiral springs H, to restore the orifices of the cut-offs to a correspondence with those of the hopper as soon as a charge has been cut off and passed on to the cartridge-shells, all substantially as and for the purposes described.

6. The combination, in a cartridge-loading machine, of the base-board A, having surface grooves $a$, and bearing the fixed slat B, provided with screw-bolts $b$, upon which are movable slats C, held in adjustment by the thumb-nuts $b'$; the wad-plate D, having orifices $d$ flared at the upper and under sides of the plate, and provided with an annular seat, $b'$, near the middle circumference of each orifice; the hopper E, divided lengthwise by the partition $e$, supported by flanges $e'$, and having flared discharge-holes $e''$; the cut-offs G, co-operating with the hopper to measure and discharge the loads, having discharge-holes $g$, flanges $g'$ to assist in moving the cut-offs and to connect them to adjustable false bottoms designed to increase their capacity, eyes $l$ for the reception of the bolts securing the false bottoms, and brackets $h'$ for the springs which restore correspondence between the discharge-holes of hopper and cut-offs; the corrugated rubber plate I, interposed between the contact-surfaces of hopper and cut-offs to lessen friction of the powder and avoid jamming the shot during the cut-off of a charge, and having orifices $i$ corresponding to those of hopper and cut-offs; the slats or false bottoms K, to increase the depth of the cut-offs, provided with discharge-holes $k$ and eyes $k'$ for the reception of the screw-bolts attaching said slats to the cut-offs; the thumb-screws L and M, to attach and detach the false bottoms to and from the cut-offs; the platform F, bearing the hopper-walls $f$, the guide wall or partition $y$ between the cut-offs, and the clamps $h$, which hold the cut-off springs, and having eyes $m$ for the reception of the screw-bolts which hold the false bottoms to the platform when not attached to the cut-offs, discharge-holes $f'''$ and guide-strips $f'$ on the under side; the step N, erected upon the platform, and having orifices corresponding to those of platform and cut-offs; and the spiral springs H, which restore the cut-offs to their place beneath the hopper when a charge has been measured and discharged, all substantially as and for the purposes described.

In testimony whereof I affix my signature in presence of two witnesses.

ROBERT POOLE.

Witnesses:
R. F. CRABTREE,
S. J. CAROLAND.